US010601731B2

(12) United States Patent
Sinha et al.

(10) Patent No.: US 10,601,731 B2
(45) Date of Patent: *Mar. 24, 2020

(54) BROADCAST SERVICES PLATFORM AND METHODS FOR USE THEREWITH

(71) Applicant: AT&T Intellectual Property I, L.P., Atlanta, GA (US)

(72) Inventors: Rakesh Sinha, Edison, NJ (US);
Jeffrey Erman, Morristown, NJ (US);
Guangzhi Li, Basking Ridge, NJ (US);
Jiasi Chen, Princeton, NJ (US);
Kadangode K. Ramakrishnan, Riverside, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/557,313

(22) Filed: Aug. 30, 2019

(65) Prior Publication Data

US 2019/0386931 A1    Dec. 19, 2019

Related U.S. Application Data

(63) Continuation of application No. 14/695,867, filed on Apr. 24, 2015, now Pat. No. 10,447,616.

(51) Int. Cl.
| | |
|---|---|
| *H04L 12/911* | (2013.01) |
| *H04L 29/06* | (2006.01) |
| *H04L 29/08* | (2006.01) |
| *H04W 4/08* | (2009.01) |
| *H04W 4/80* | (2018.01) |

(52) U.S. Cl.
CPC ........ *H04L 47/828* (2013.01); *H04L 65/4076* (2013.01); *H04L 67/22* (2013.01)

(58) Field of Classification Search
CPC ..... H04L 12/5695; H04L 29/06; H04L 47/15; H04L 47/808; H04L 47/828; H04L 67/306
USPC .................................................. 370/212, 229
See application file for complete search history.

(56) References Cited

U.S. PATENT DOCUMENTS

| 7,804,792 B2 | 9/2010 | Choi et al. |
|---|---|---|
| 8,301,951 B2 | 10/2012 | Miki et al. |
| 8,861,528 B2 | 10/2014 | Josiam et al. |
| 8,923,321 B2 | 12/2014 | Smith et al. |
| 2004/0088314 A1 | 5/2004 | Simes |

(Continued)

OTHER PUBLICATIONS

Chen et al, "Fair and Optimal Resource Allocation for LTE Multicast (eMBMS): Grop Participation and Dynamics", IEEE Infocom, 2015, 9 pages.

*Primary Examiner* — Melvin C Marcelo
*Assistant Examiner* — Natali Pascual Peguero
(74) *Attorney, Agent, or Firm* — Garlick & Markison; Bruce E. Stuckman

(57) ABSTRACT

Aspects of the subject disclosure may include, for example, a broadcast services platform includes a memory that stores operational instructions. A processor executes the operational instructions to: receive user data, the user data including a list of users and performance metric data corresponding to individual ones of the users; sort the list of the users in order of the performance metric data to generate a sorted list of the users; partition the sorted list of the users to generate a plurality of user groups; and generate network resource allocation data that allocates network resources to provide broadcast services to the users. Other embodiments are disclosed.

20 Claims, 10 Drawing Sheets

(56) References Cited

U.S. PATENT DOCUMENTS

| | | |
|---|---|---|
| 2004/0136379 A1 | 7/2004 | Liao et al. |
| 2006/0146863 A1 | 7/2006 | Spinar et al. |
| 2009/0196304 A1 | 8/2009 | Sayenko |
| 2010/0260179 A1 | 10/2010 | Bae et al. |
| 2013/0028118 A1 | 1/2013 | Cherian et al. |
| 2013/0163444 A1 | 6/2013 | Tee et al. |
| 2013/0301510 A1 | 11/2013 | Zhang et al. |
| 2013/0301539 A1 | 11/2013 | Aguirre et al. |
| 2013/0343259 A1 | 12/2013 | Barrett |
| 2014/0204824 A1 | 7/2014 | Chen et al. |
| 2014/0250456 A1 | 9/2014 | Ramkumar et al. |
| 2014/0286222 A1 | 9/2014 | Yu et al. |
| 2015/0117235 A1 | 4/2015 | Bhanage et al. |

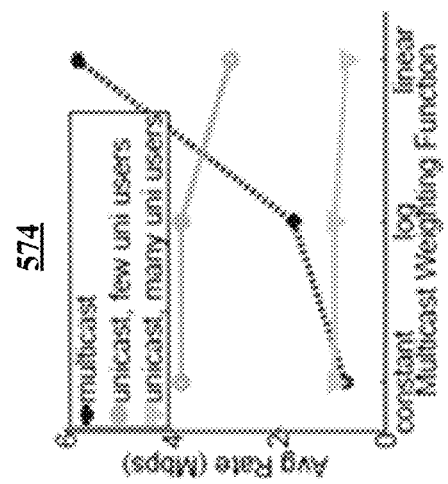
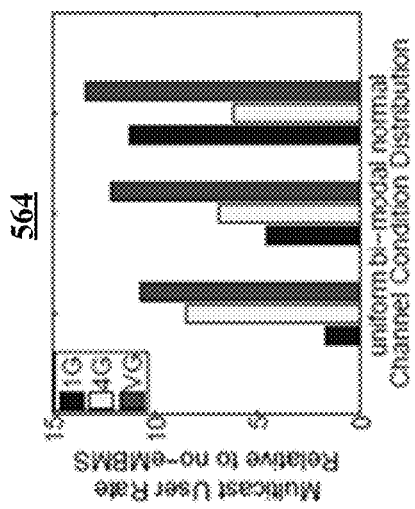
FIG. 5E
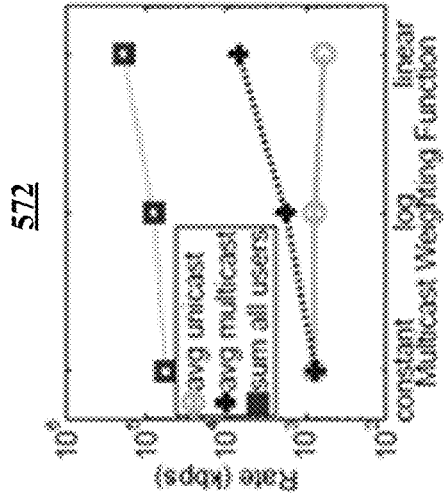
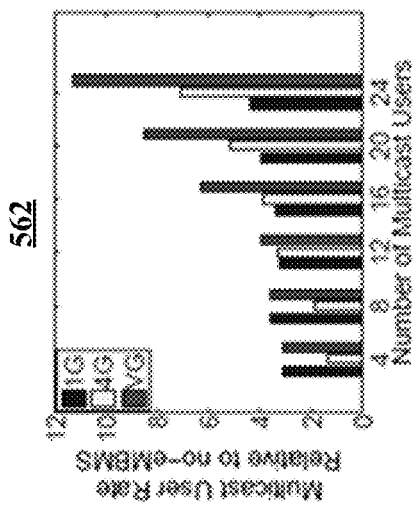
FIG. 5F

800

BROADCAST SERVICES PLATFORM AND METHODS FOR USE THEREWITH

CROSS-REFERENCE TO RELATED APPLICATIONS

The present U.S. Utility patent application claims priority pursuant to 35 U.S.C. § 120 as a continuation of U.S. Utility application Ser. No. 14/695,867, entitled "BROADCAST SERVICES PLATFORM AND METHODS FOR USE THEREWITH", filed Apr. 24, 2015, which is hereby incorporated herein by reference in its entirety and made part of the present U.S. Utility Patent Application for all purposes.

FIELD OF THE DISCLOSURE

The subject disclosure relates to broadcast services in a communication network.

BRIEF DESCRIPTION OF THE DRAWINGS

Reference will now be made to the accompanying drawings, which are not necessarily drawn to scale, and wherein:

FIG. 5A-5F are tabular and graphical diagrams that present comparisons of various example, non-limiting embodiments in accordance with various aspects described herein.

DETAILED DESCRIPTION

Figure 1:
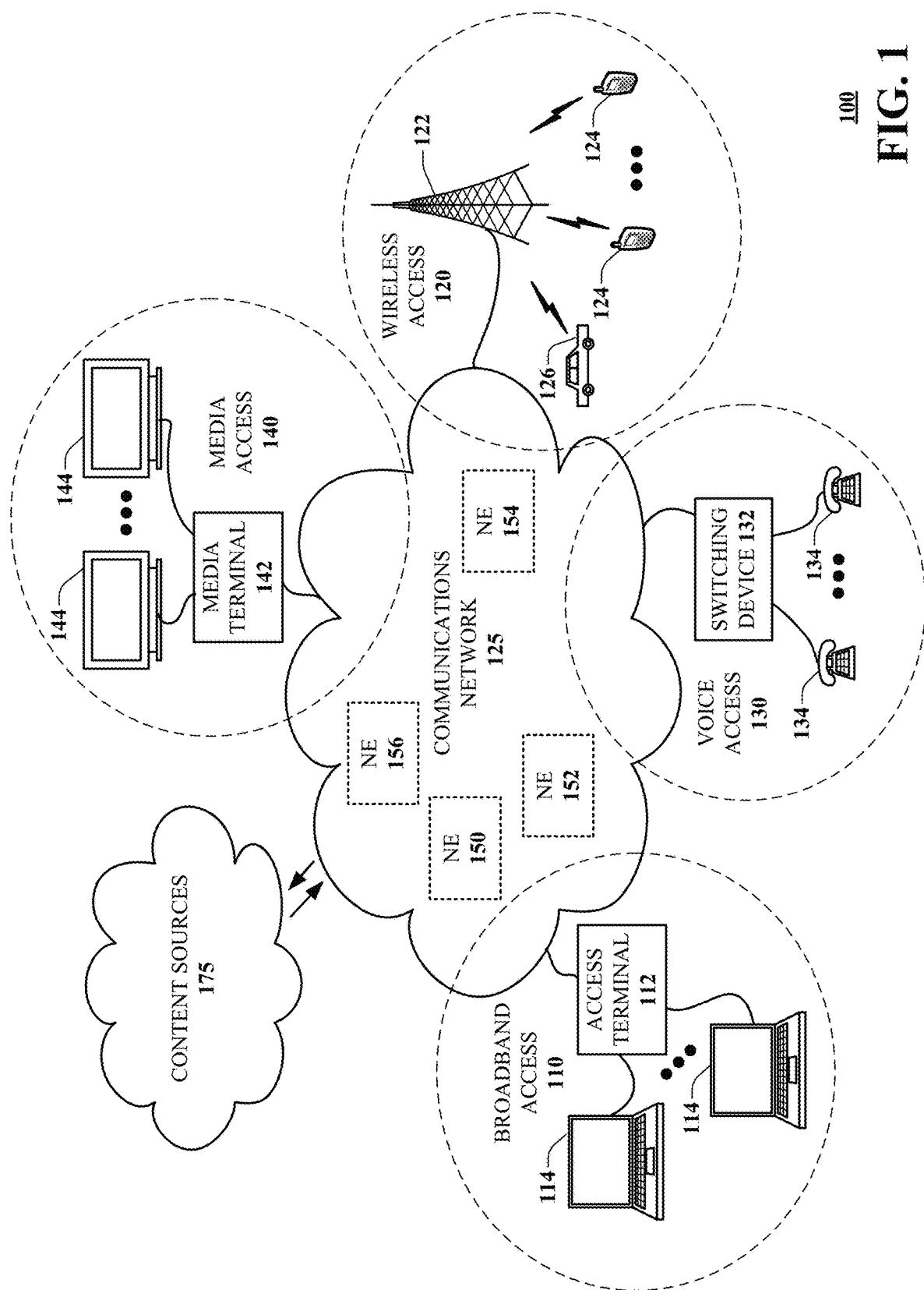
FIG. 1 is a block diagram illustrating an example, non-limiting embodiment of a communications network in accordance with various aspects described herein.

One or more embodiments are now described with reference to the drawings, wherein like reference numerals are used to refer to like elements throughout. In the following description, for purposes of explanation, numerous details are set forth in order to provide a thorough understanding of the various embodiments. It is evident, however, that the various embodiments can be practiced without these details (and without applying to any particular networked environment or standard).

In accordance with one or more embodiments, a broadcast services platform includes a memory that stores operational instructions. A processor executes the operational instructions to: receive user data, the user data including a list of users and performance metric data corresponding to individual ones of the users; sort the list of the users in order of the performance metric data to generate a sorted list of the users; partition the sorted list of the users to generate a plurality of user groups; and generate network resource allocation data that allocates network resources to provide broadcast services to the users.

In accordance with one or more embodiments, a method includes: receiving user data, the user data including a list of users and performance metric data corresponding to individual ones of the users; sorting the list of users in order of the performance metric data to generate a sorted list of the users; partitioning the sorted list of the users to generate a plurality of user groups; and generating network resource allocation data that allocates network resources to provide broadcast services to the users.

In accordance with one or more embodiments, an article of manufacture a includes a tangible storage medium that stores operational instructions, that when executed by a processor, causes the processor to: receive user data, the user data including a list of users and performance metric data corresponding to individual ones of the users; sort the list of the users in order of the performance metric data to generate a sorted list of the users; partition the sorted list of the users to generate a plurality of user groups; and generate network resource allocation data that allocates network resources to provide broadcast services to the users.

Referring now to FIG. 1, a block diagram 100 illustrating an example, non-limiting embodiment of a communications network in accordance with various aspects described herein, is shown. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text or other media. While broadband access 110, wireless access 120, voice access 130 and media access 140 are shown separately, one or more of these forms of access can be combined to provide multiple access services to a single client device.

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched telephone network, a voice over Internet protocol (VoIP) network, Internet protocol (IP) based television network, a cable network, a passive or active optical network, a 4G or higher wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G or higher modem, an optical modem and/or other access devices.

In various embodiments, the base station or access point 122 can include a 4G or higher base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2:
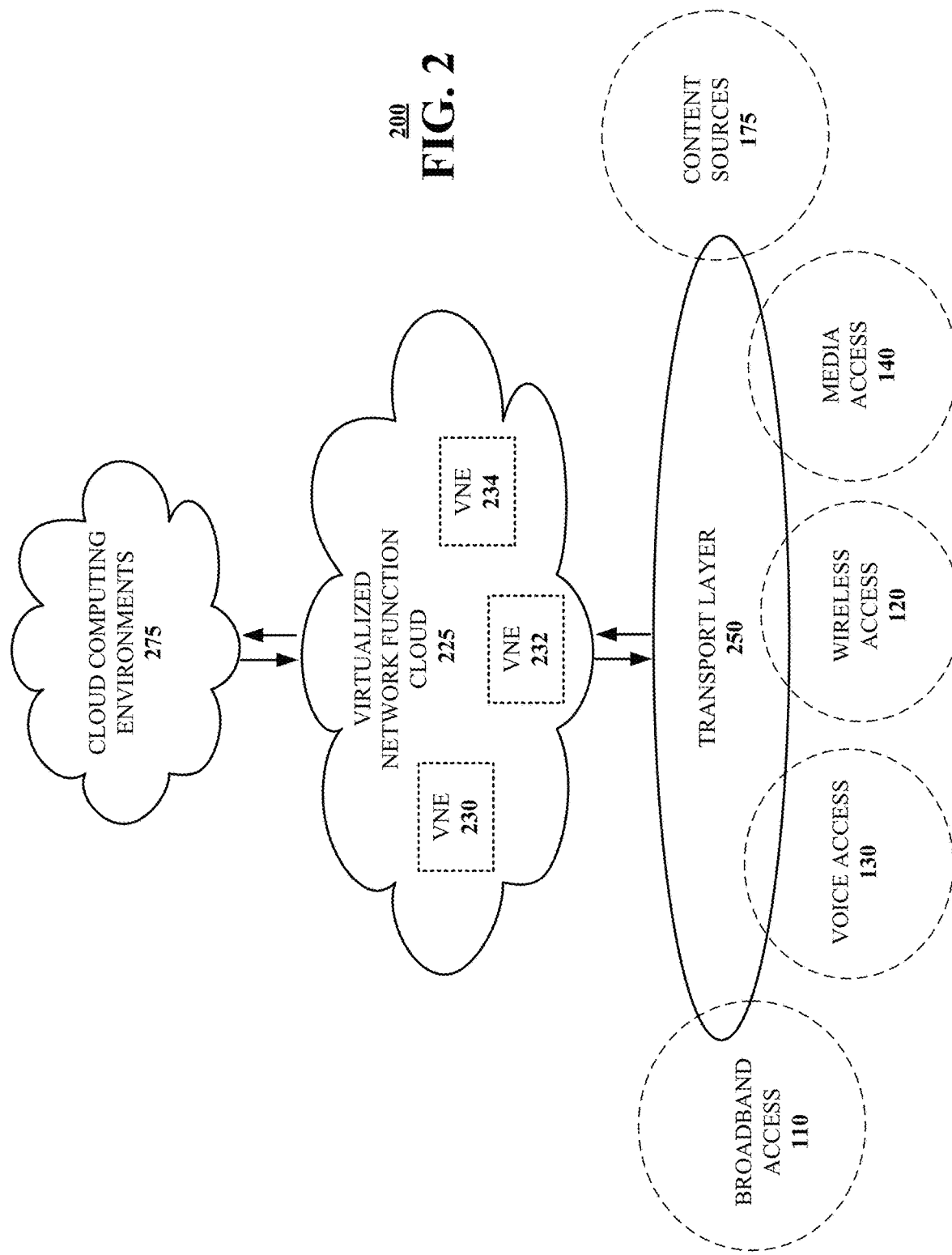
FIG. 2 is a block diagram illustrating an example, non-limiting embodiment of a virtualized communication network in accordance with various aspects described herein.

Referring now to FIG. 2, a block diagram 200 illustrating an example, non-limiting embodiment of a virtualized communication network in accordance with various aspects described herein, is shown. In particular a virtualized communication network is presented that can be used to implement some or all of the communications network 125 presented in conjunction with FIG. 1.

In particular, a cloud networking architecture is shown that leverages cloud technologies and supports rapid innovation and scalability via a transport layer 250, virtualized network function cloud 225 and/or one or more cloud computing environments 275. In various embodiments, this cloud networking architecture is an open architecture that leverages application programming interfaces (APIs), reduces complexity from services and operations; supports more nimble business models and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements 230, 232, 234, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrate. The most typical type of substrate being servers that support Network Function Virtualization (NFV), followed by packet forwarding capabilities based on generic computing resources, with specialized network technologies brought to bear when general purpose processors or merchant silicon are not appropriate. In this case, communication services can be implemented as cloud-centric workloads.

As an example, a traditional network element 150, such as an edge router can be implemented via a virtual network element 230 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing that infrastructure easier to manage.

In an embodiment, the transport layer 250 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as virtual network elements 230, 232 or 234. These network elements can be included in transport layer 250.

The virtualized network function cloud 225 interfaces with the transport layer 250 to provide the virtual network elements 230, 232, 234, etc. to provide specific NFVs. In particular, the virtualized network function cloud 225 leverages cloud operations, applications, and architectures to support networking workloads. The virtualized network elements 230, 232 and 234 can employ network function software that provides either a one-for-one mapping of traditional network element function or alternately some combination of network functions designed for cloud computing. For example, virtualized network elements 230, 232 and 234 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large aggregates of traffic, their workload can be distributed across a number of servers—each of which adds a portion of the capability, and overall which creates an elastic function with higher availability than its former monolithic version. These virtual network elements 230, 232, 234, etc. can be instantiated and managed using an orchestration approach similar to those used in cloud compute services.

The cloud computing environments 275 can interface with the virtualized network function cloud 225 via APIs that expose functional capabilities of the VNE 230, 232, 234, etc. to provide the flexible and expanded capabilities to the virtualized network function cloud 225. In particular, network workloads may have applications distributed across the virtualized network function cloud 225 and cloud computing environment 275 and in the commercial cloud, or might simply orchestrate workloads supported entirely in NFV infrastructure from these third party locations.

Figure 3:
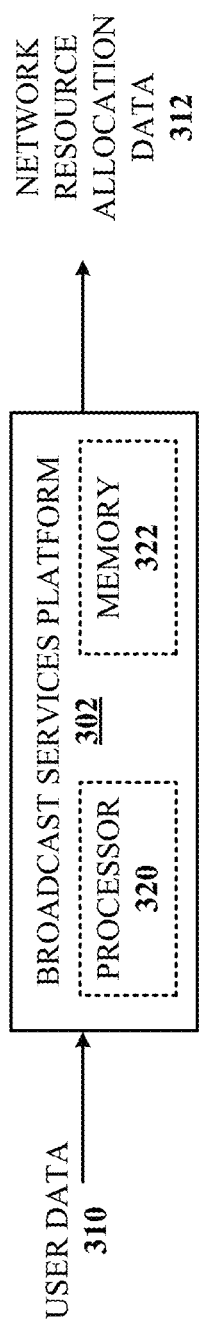
FIG. 3 is a block diagram illustrating an example, non-limiting embodiment of broadcast services platform in accordance with various aspects described herein.

Turning now to FIG. 3, is a block diagram 300 illustrating an example, non-limiting embodiment of broadcast services platform in accordance with various aspects described herein, is shown. In particular, a broadcast services platform 302 is presented that includes a memory 322 that stores operational instructions. The processor 320 executes the operational instructions to receive user data 310 that includes a list of users requesting broadcast services from the broadcast services platform 302 together with performance metric data corresponding to individual ones of the users. The processor 320 sorts the list of the users in order of the performance metric data to generate a sorted list of the user and partitions the sorted list of the users to generate a plurality of user groups. The processor 320 generates network resource allocation data 312 that allocates network resources to provide broadcast services to the users.

In one or more embodiments, the network resource allocation data can allocate wireless network resources to stream multimedia content to users on either a multicast basis or unicast basis. The plurality of user groups include at least one multicast user group. Partitioning the sorted list of the users can include determining if one of the plurality of user groups includes a single user, and allocating the network resources can designate the single user as a unicast user, when one of the plurality of user groups includes the single user. Partitioning the sorted list of the users can generate either a fixed or variable number of user groups. The performance metric can include coding performance such as a coding scheme, a data rate, a channel performance such as a channel throughput, bit rate or other performance metric.

In one or more embodiments, sorting the list of the users in order of the performance metric data includes either sorting the list of users as asymptotically increasing or decreasing values of the performance metric. The list of the users can correspond to a plurality of mobile users. The plurality of user groups can be generated by partitioning the sorted list of users recursively, and in accordance with a weighted utility function.

Cellular multicast is gaining traction as a method of efficiently using wireless spectrum to deliver large amounts of multimedia data to multiple cell sites. Consider an example where the broadcast services platform 302 includes a Multimedia Broadcast Multicast Service (MBMS) platform such as an Multicast Coordination Entity (MCE) that utilizes eMBMS as part of an LTE network or other mobile broadcast services. Given a set of unicast and multicast users, the broadcast services platform 302 determines how to partition multicast users into different groups and further how much resources to allocate to each multicast group as well as to unicast users. To do so, the broadcast services platform 302 can consider parameters such as the multicast coding scheme, the resources allocated to unicast users and their scheduling at the base stations, the resources allocated to a multicast group to satisfy the user experience of its members, and the number of groups and their membership. To handle the heterogeneity of user channel conditions, the broadcast services platform 302 arranges multicast users into groups so that users with good signal strength do not suffer by being grouped together with users of poor signal strength. Such an approach can balance optimality and fairness and take into consideration the tradeoff between improving unicast user rates and improving spectrum efficiency through multicast.

Further examples and implementations including one or more optional functions and features are presented in conjunction with FIGS. 4-9 that follow.

Figure 4:
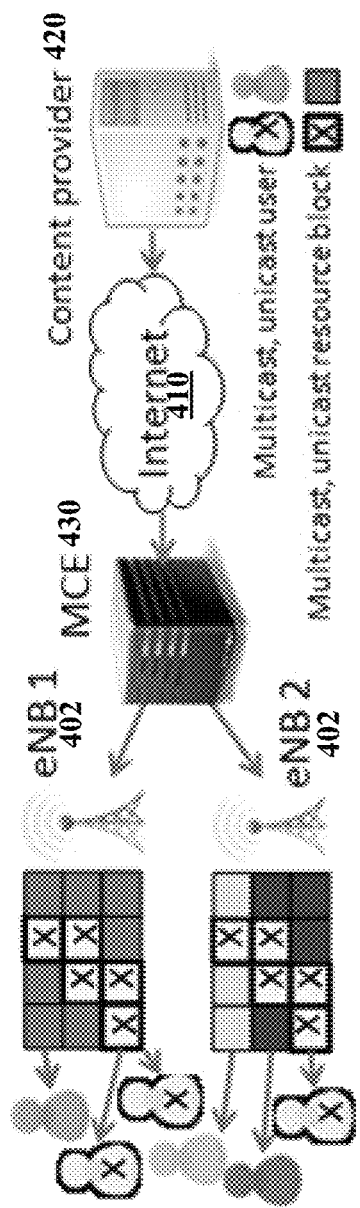
FIG. 4 is a block diagram illustrating an example, non-limiting embodiment of communication system in accordance with various aspects described herein.

Turning now to FIG. 4, a block diagram illustrating an example, non-limiting embodiment of communication system 400 in accordance with various aspects described herein, is shown. In particular, the communication system 400 includes an example of communication network 125 that focuses on an Evolved Multimedia Broadcast Multicast Service (eMBMS) for multicast over an LTE networks. eMBMS can be particularly effective when requests for content have significant spatial and temporal locality, as is likely to be the case when users consume live video and music as well as popular on-demand content including news, advertisements and software distribution, in addition to video and music.

Content delivery over cellular networks can provide a challenge, with the last hop radio access network (RAN) being a potential bottleneck and a significant source of latency. Content delivery networks (CDNs) can relieve the backbone bandwidth utilization and reduce latency to deliver content to the end-user, but only provide a relatively small amount of relief. Similarly, traditional multicast solutions typically save resource consumption in the backbone (i.e., further up the multicast tree). With multicast on the cellular "last mile," the improvement in last-hop bottleneck utilization, end-to-end latency, and the cost of deploying resources to deliver content over cellular networks may be more effectively addressed.

In accordance with this example, the Multicast Coordination Entity (MCE) 430 provides an example of broadcast services platform 302 that operates to allocate and reserve resources for multicast users in the eMBMS service area to provide content from content provider 420 via the Internet 410. The resources in the service area may encompass more than one eNB 402 as shown. The eNBs 402 schedule unicast users in the remaining resource blocks.

Cellular network operators are continuing to evolve their strategies for deploying eMBMS. They also seek to understand how best to utilize scarce wireless resources, especially when there are users with heterogeneous channel conditions, and in the presence of a number of users consuming unicast traffic. These unicast users may be serviced by different eNBs, as shown, due to the envisaged large service area of eMBMS. The network operator decides how many resources to allocate to each unicast user at each eNB and to the multicast group(s). Allocating more resources for multicast has the potential to reduce the quality of experience (QoE) of a unicast user, while allocating more resources for unicast reduces the efficiency with which wireless spectrum is utilized. The network operator decides how many multicast groups to offer, and which users interested in multicast content should band together to form a group. Grouping users with disparate channel conditions into one multicast group is unfair to the users with good channel conditions, as all group members will be constrained by the receivable rate of the worst user in the group (to ensure all users receive the transmitted data with high probability). Splintering potential multicast users into a large number of individual groups is similar to unicast and fails to take advantage of eMBMS. The techniques described in conjunction with FIG. 3 can address these issues by grouping users together in an efficient and fair manner. Further details regarding such implementations are presented in conjunction with FIG. 5.

Figure 5A:
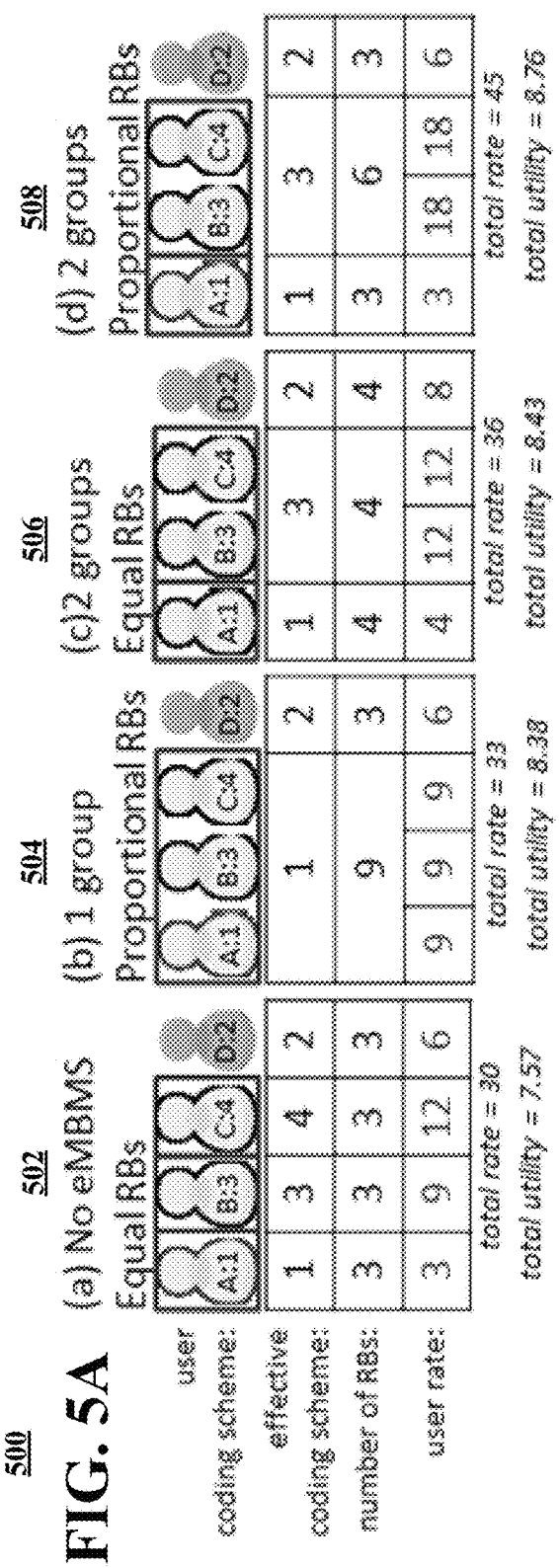

Turning now to FIGS. 5A-5F, tabular and graphical diagrams 500, 520, 540, 550, 560 and 570 present comparisons of various example, non-limiting embodiments in accordance with various aspects described herein. In FIG. 5A, examples are presented for three potential multicast users (A,B,C) and one unicast user (D) who are served by one base station with a total of 12 resource blocks (RBs). User (A:η) means user A has coding scheme that achieves η bit/RB. The user grouping is shown by the placement of each user in boxes. The user rate is calculated as the coding scheme×number of RBs. Case (a) is represented by table 502. All users are unicast and are allocated an equal share of resources, receiving rates proportional to their coding schemes. Case (b) is represented by table 504. With eMBMS, the disclosure could group all multicast users together and combine their resources. This causes user A's rate to increase because she shares resources with the group, but user C's rate suffers because she is forced to use the same coding scheme as user A. Were this the final solution, user C would prefer to leave her multicast group and switch to unicast, as in case (a), in order to receive 12 bits instead of 9. Case (c) is represented by table 506. Separating users B and C, who have similar channel conditions, from user A and putting them in their own sub-group improves the utility. Case (d) is represented by table 508. Allocating more RBs for multicast increases system efficiency in terms of total rate and utility. Both case (c) and (d) ensure that all of the multicast users receive higher rate than if they switched to unicast in case (a).

In the optimal (or Pareto-optimal) solution of case (d), all of the multicast users achieve equal or better rate compared to the unicast case (a), so they will not defect from the multicast group, but this may not be generally true. Thus, a user's rate is determined by the number of RBs (variable), her own coding scheme (fixed, based on her channel conditions), the user grouping (variable), and the group coding scheme (variable). To capture both fairness of the user rates and efficiency of the system, a proportional fair metric can be employed, such as a weighted utility function or other metric to measure global utility. In particular, such a metric can be based on the sum of the log of the long-term rates of the users. Considering a set of multicast users who are interested in accessing one particular multicast content, the techniques disclosed herein can jointly optimize the multicast resources and user grouping to maximize the proportional fair utility for multicast and unicast users across multiple cells in the eMBMS service area. For a single cell, the techniques disclosed herein can be used to analyze the disparity between the globally optimal solution and the local preference of the greedy user who is trying to maximize her own rate.

In an embodiment, system is designed to meet several goals:

Constraint: Users subscribing to a multicast group should receive all the content multicast by eMBMS. This might not happen if, for example, eMBMS chooses too good a coding scheme. Then, a user with poor channel conditions will experience a higher bit-error rate and consequent data loss, which is especially intolerable for streaming content such as music and video.

Fair and efficient: The received rate across all users in all cells covered by the eMBMS service area should be fairly distributed; i.e., a user with very good channel conditions should not consume all of the resources to the detriment of users with poor channel conditions. Conversely, users with good channel conditions should not suffer unduly by being placed in a multicast group that receives a very poor rate. The disclosure below quantifies this fairness using the proportional fair metric.

Dynamics: The users should be satisfied with their rates under the globally fair resource allocation and user grouping decided by the network operator. Few users should be tempted to selfishly maximize their own rate by leaving their multicast group, thereby decreasing the rate of the remaining users in the group; or vice versa.

The optimization framework can be designed by considering: (1) The optimization problem is an integer problem with non-linear constraints, for which a brute force approaches require exponential time to solve; (2) The network operator should encourage users to follow the optimal solution by offering them a better receive rate and overall improved resource usage, rather than forcing users to join or leave a multicast group; (3) The eMBMS architecture only allows for multicast resource allocation and must respect the unicast resource allocation decisions already made by the eNB. The resource allocation problem can be posed to maximize the end-user's QoE based on the user rate, in accordance with eMBMS specifications and the existing LTE architecture. In particular, the discussion below presents an optimal and efficient algorithm that decides on the resource allocation for the multicast group and the unicast users across multiple cell sites, and optimally groups together multicast users with similar channel conditions in accordance with a weighting function that trades-off between efficiency and fairness of the rate received by multicast and unicast users. Results of detailed simulations across a variety of different cellular conditions, are used to compare this solution with three alternatives: (a) a default solution that puts all users into one multicast group and chooses the worst coding scheme; (b) a more advanced heuristic that takes users' channel conditions into consideration and assigns users to one of four groups; and (c) a state-of-the-art approach from the literature. The proposed techniques perform well across a variety of scenarios and automatically adapts to the channel conditions of the users. The analysis presented herein provides insights on the interaction between the user's selfish rate maximization and the globally optimal solution. The channel conditions that cause users to deviate from the globally optimal solution are characterized, and the number of users who would benefit by switching from multicast to unicast are bound. The tradeoff between giving enough resources to unicast vs. over-provisioning resources for multicast users, to prevent them from fleeing the group are numerically quantified.

I. Background and Problem Formulation

A. Background on LTE and eMBMS

In LTE, wireless radio resources are OFDMA frames. Frames are further divided into resource blocks (RBs) in the time and frequency domains, which are the basic minimum unit of resource allocation. For unicast users, the job of the eNodeB (LTE base station, hereafter shortened to eNB) scheduler is to fill the RBs with data packets for its clients, often through some variant of a proportional fair scheduler.

TABLE I

Table of notation.

| | Symbol | Description |
|---|---|---|
| Inputs | M | number of users interested in multicast service |
| | B | number of eNBs in the MBSFN area |

TABLE I-continued

Table of notation.

|  | Symbol | Description |
|---|---|---|
|  | $U_b$ | set of unicast users at eNB b |
|  | $N = \Sigma_{b=1}^{B} |U_b|$ | total number of unicast users in the MBSFN area |
|  | $c_i$ | coding scheme of multicast user i (bits/RB) |
|  | $d_i$ | coding scheme of unicast user i (bits/RB) |
|  | T | total number of resource blocks (RBs) |
|  | α | maximum fraction of resources for multicast |
| Variables | K | number of multicast groups |
|  | $G_k$ | set of users in multicast group k |
|  | $\hat{c}_k$ | coding scheme of multicast group k (bits/RB) |
|  | $x_k$ | RBs of multicast group k (RBs) |
|  | $y_i$ | RBs of unicast user i (RBs) |

Since users have different channel conditions, the eNB chooses an appropriate modulation and coding scheme (MCS), hereafter referred to as coding scheme, for each client, based on client feedback of the measured channel conditions. The coding scheme determines how many bits can be transmitted per resource block. Users with good signal strength can use more efficient coding schemes, and vice versa. If the eNB chooses a coding scheme that is higher than what the client's channel can support, then the client will not be able to decode the data and will suffer data loss due to high bit error rates.

In eMBMS, each multicast group uses resource blocks encoded with the same coding scheme. All users in a particular group receive the same data transmission. The multicast resource allocation and coding scheme can be decided by the multi-cell/multicast coordinating entity, such as MCE 430 of FIG. 4. The typical envisaged eMBMS deployment covers multiple neighboring eNBs, called a multicast-broadcast single frequency network (MBSFN), so as to exploit multicast across a sufficient number of recipients and improve QoE at the cell edge. The MCE provides the multicast resource allocation to the eNBs under its control. Each eNB reserves these resources for the multicast flows, and schedules its own unicast users with the remaining resources. Therefore, the resource block allocation for each eNB will be different depending on the unicast users, but the multicast resource block allocation will be the same across all eNBs.

B. Problem Formulation

Our problem is a mixed integer optimization problem with two parts. Prob. 1 is the global rate optimization for both multicast and unicast users. Prob. 2 is the eNB resource allocator at each eNB for the unicast users. These two problems are related because the global optimization should consider the impact of the multicast resource allocation on the unicast users. However, the eMBMS architecture does not provide the flexibility to modify the unicast scheduler. Instead, by understanding how the multicast resource allocation impacts unicast scheduling, the disclosure below can optimize for both sets of users.

Optimizing multicast resources and user grouping: The control knobs are (a) to decide which users, out of those who are interested in a particular multicast content, should be put into the same multicast group, and (b) how many resources to give to each multicast group and to the remaining unicast users, in order to maximize the proportional fair rate for all users. Prob. 1 gives the complete optimization problem.

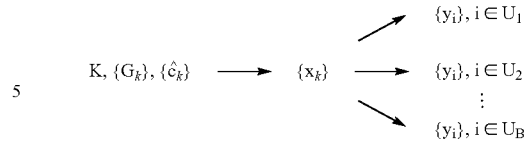

For each K, $\{G_k\}$, $\{\hat{c}_k\}$, we solve for the optimal $\{x_k\}$, $\{y_i\}$, calculate the total utility, and pick the best K, $\{G_k\}$, $\{\hat{c}_k\}$. We show our final solution is jointly optimal.

Problem 1. Multicast and Unicast Resource Allocator and Multicast Group Partitioning for Multiple eNBs $$\text{maximize} \sum_{b=1}^{B} \sum_{i \in U_b} \log(d_i y_i) + \sum_{k=1}^{K} |G_k| \log(\hat{c}_k x_k) \quad (1)$$

$$\text{s.t.} \sum_{i \in U_b} y_i + \sum_{k=1}^{K} x_k \leq T, \forall b \quad (2)$$

$$\hat{c}_k = \min_{i \in G_k} c_i, \forall k \quad (3)$$

$$x_k \leq \frac{f(G_k)}{N + \sum_{\ell=1}^{K} f(G_\ell)} T, \forall k \quad (4)$$

$$0 \leq \sum_{k=1}^{K} x_k \leq \alpha T \quad (5)$$

$$G_1 \cup \ldots \cup G_k = \{1, 2, \ldots, M\} \quad (6)$$

$$G_k \cap G_\ell = 0 \; \forall k, \ell \quad (7)$$

variables $\{y_i\}, \{x_k\}, \{G_k\}, \{\hat{c}_k\}, K$

The objective (1) is to maximize the sum log-utility for multicast and unicast users. Constraint (2) says that the sum of the unicast and multicast RBs at each eNB must be less than the total RBs. Constraint (3) guarantees that all users in the group can receive all multicast data by setting the coding scheme of the multicast group to that of the worst user in the group. Constraint (5) limits the percentage of RBs available for multicast, which is 60% in today's eMBMS specification. Constraints (6-7) say that each multicast user is a member of a multicast group.

Multicast weighting function: A desirable feature of the multicast optimization is to ensure that users are allocated a proportionally fair rate, but also that both multicast and unicast users share the benefits of eMBMS. This disclosure introduces a weighting function $f(G_k)$ in constraint (4) that can be chosen to modulate the resource allocation of the multicast users to be more similar to either unicast or multicast. Specifically, this disclosure, for example, considers the weighting functions to be one of three classes:

Constant: $f(G_k)=1$ \quad (8)

Logarithmic: $f(G_k)=\log(|G_k|+1)$ \quad (9)

Linear: $f(G_k)=|G_k|$ \quad (10)

For the constant form $f(G_k)=1$, the weighting function treats each multicast group similar to a single unicast user. This is because when all users are unicast, the regular proportional fair scheduler gives an equal share of the total available resources to each user. For the linear form $f(G_k)$ =$|G_k|$, the resources given to the multicast group is similar to what resources each user in the group would have received as a unicast user and then pooled all their resources together. This disclosure also introduces the logarithmic form $f(G_k)=\log(|G_k|+1)$ to be in between the linear and constant functions. This weighting function can be a tunable parameter for the network operator.

eNB unicast resource allocator: In practice, the MCE cannot control the unicast RBs, which is a variable in Prob. 1. Instead, each eNB in the eMBMS service area schedules RBs for the unicast users in its cell. Any solution to Prob. 1 must take into account the behavior of the eNB's scheduler, which is based on a standard proportional fair scheduler:

Problem 2. eNB b's Unicast Resource Allocator $$\text{maximize} \sum_{i \in U_b} \log(d_i y_i) \quad (11)$$

$$\text{s.t.} \sum_{i \in U_b} y_i \leq T - \sum_{k=1}^{K} x_k \quad (12)$$

variables $\{y_i\}$

The objective (11) is to maximize the proportional fair rate across all the unicast users. Constraint (12) says that the total unicast RBs cannot exceed the total RBs less the resources previously allocated by the MCE for multicast.

Time scale of optimization: When the channel conditions of the users change, or when users arrive and depart, the multicast resource allocation and user grouping previously chosen by the MCE may become sub-optimal. However, in the envisioned eMBMS use cases, such as sports events or stadiums with large audiences, users are fairly stationary, so the time scales of channel condition dynamics will be relatively long. This disclosure leaves this as a design parameter for the network operator which can be chosen based on historical or expected user dynamics. It should be noted that making an optimal allocation in situations of high speed mobility may require additional parameters and flexibility.

Multimedia content delivery: eMBMS is intended for multimedia streaming content such as video. Traditional videos require a fixed rate for content delivery, but with the prevalence of adaptive bitrate streaming protocols, content providers encode and store multiple versions of each video at different rates. The appropriate video rate should be selected to fully utilize the reserved multicast resources.

II. Solutions for Resource Allocation & Group Partitioning

The solution to Prob. 1 has two steps: (Step 1), an outer loop where a search is performed across possible user groups, with associated optimal utility, and find the best user grouping; (Step 2), an inner loop where for fixed user grouping, solving for the optimal resource allocation and utility. These two steps give us the jointly optimal solution to Prob. 1.

B. Resource Allocation

This section discusses the inner loop of the solution to Prob. 1, where the multicast user grouping $G=\{G_1, \ldots, G_K\}$ of users is fixed (which also fixes the number of groups, K, and multicast group coding schemes $\{\hat{c}_k\}$ of all groups). Then the variables are the multicast and unicast RBs $\{x_k\}$, $\{y_i\}$. Under the eMBMS architecture, the unicast RBs $\{y_i\}$ cannot be controlled by the MCE; instead, this disclosure determines the correct optimization problem to be solved by the MCE which, in combination with the eNB proportional fair scheduler, induces the solution to Prob. 1 for fixed user grouping. Therefore, this disclosure further decomposes the resource allocation solution into two steps: (Step 2a) on the multicast MCE, optimize the multicast RBs (Prob. 3); and (Step 2b) on each eNB, optimize the unicast RBs (Prob. 2).

Problem 3. MCE Multicast Resource Allocator $$\text{maximize} \sum_{b=1}^{B} \sum_{i \in U_b} \log(d_i y_i^*(\{x_k\})) + \sum_{k=1}^{K} |G_k| \log(\hat{c}_k x_k) \quad (13)$$

$$\text{s.t.} \quad \hat{c}_k = \min_{i \in G_k} c_i, \forall k \quad (14)$$

$$x_k \leq \frac{f(G_k)}{N + \sum_{\ell=1}^{K} f(G_\ell)} T, \forall k \quad (15)$$

$$0 \leq \sum_{k=1}^{K} x_k \leq \alpha T \quad (16)$$

variables $\{x_k\}$

The MCE adjusts the multicast RBs, taking into account the impact on the unicast RBs. The objective function (13) is similar to the objective function (1) from Prob. 1, but contains $y_i$ ($\{x_k\}$), which is the solution of Prob. 2. The constraints (14) (15) (16) are the same as (3) (4) (5) from Prob. 1.

At the eNB, the proportional fair scheduler allocates unicast RBs equally to each user, as given by Lemma 1. This means that users with good channel conditions receive higher rate and users with poor channel conditions receive lower rate.

Lemma 1. The Solution of Prob. 2 is:

$$y_i^*(x) = \frac{T - \sum_{k=1}^{K} x_k}{|U_b|}, \forall i \in U_b, \forall b$$

Finally, Lemma 2 and Prop. 1 show that the MCE optimization plus the eNB optimization together result in the jointly optimal solution to Prob. 1, for fixed user grouping.

Lemma 2. Given K, $\{G_k\}$, $\{\hat{c}_k\}$, the Feasible Solution Set of Prob. 1 is Equal to the Feasible Solution Set of Prob. 2 and Prob. 3.

Proposition 1. Given K, $\{G_k\}$, $\{\hat{c}_k\}$, the Solution of Prob. 1:

$$x_k^* = \begin{cases} \frac{f(G_k)}{N + \sum_l f(G_l)} T & \text{if } \alpha \geq \frac{\sum_l f(l)}{N + \sum_l f(G_l)} \\ \min\left(\frac{|G_k|}{\frac{U}{(1-\alpha)T} + \lambda}, \frac{f(G_k)}{N + \sum_k f(G_k)} T\right) & \text{if } \alpha < \frac{\sum_l f(l)}{N + \sum_l f(G_l)} \end{cases}$$

where $\lambda$ satisfies $\sum_l \min\left(\frac{|G_l|}{\frac{U}{(1-\alpha)T} + \lambda}, \frac{f(G_l)}{N + \sum_k f(G_k)} T\right) = \alpha T$ The solution to the multicast resource allocation problem has two cases depending on the total fraction of resources $\alpha$ allowed for multicast. When $\alpha$ is large, then the solution gives resources proportional to the multicast constraint function $f(G_k)$. When $\alpha$ is small, i.e. the system wants to give more resources than allowed to multicast, the solution can be found by a variant of a water-filling algorithm. For the linear multicast weighting function $f(G_k)=|G_k|$ the solution can be further simplified as in Corollary 1. If $\alpha$ is large, the system allocates resources to each multicast group proportional to the size of the group. If $\alpha$ is small, the solution is to split $\alpha T$ RBs between the multicast groups, and leave the remaining RBs for unicast users. The overall resource allocation solution is computed by the RESOURCEMULTI function in Alg. 1.

Corollary 1. For Fixed K, $\{G_k\}$, $\{\hat{c}_k\}$, and $f(G_k)=|G_k|$, the Solution of Prob. 1 is:

$$x_k^* = \begin{cases} \dfrac{|G_k|}{N + \sum_l |G_l|} T & \text{if } \alpha \geq \dfrac{\sum_l |G_l|}{N + \sum_l |G_l|} \\ \dfrac{|G_k|}{\sum_l |G_l|} \alpha T & \text{if } \alpha < \dfrac{\sum_l |G_l|}{N + \sum_l |G_l|} \end{cases} \quad (17)$$

B. Group Membership Assignment

Even with the partial solution to Prob. 1 given in Prop. 1, finding the user grouping is not straightforward. The system must decide how to optimally partition users into multicast groups based on their channel conditions. Intuitively, users with identical channel conditions should be grouped together, but what about users with similar channel conditions? The brute force solution is to try all possible partitions of the users and pick the partition that gives the maximum utility. The complexity of this approach is $O(M^M)$. Instead, an optimal dynamic programming solution is presented that runs in $O(M^4)$. The dynamic program uses the intuition that users with similar channel conditions should be in the same group, and first sorts the multicast users by their coding schemes.

Lemma 3. Let the Users be Sorted in Ascending Order According to Coding Scheme. Define an Unordered Grouping as a Group that Contains User i and User i+j but not Some User i+k, 1<k<j. Then there is an Optimal Solution without any Unordered Grouping.

With the list of users sorted by increasing channel conditions, the problem can be thought of as placing partitions between users on the list, with users between two consecutive partitions forming a multicast group. The decision is where to place the partitions, and how many partitions to place. The problem is complicated because the coding scheme of the multicast group, and thus the rate and overall utility to be maximized, is determined by the placement of the partitions. The user immediately to the right of a partition determines the coding scheme and utility of her multicast group. Exhaustively trying all possible partitions takes $O(2^M)$.

The possible partitions can be efficiently searched using the recurrence relation given in Prop. 2. The idea is that the maximum utility from k groups can be found by considering the optimal utility of k−1 groups, plus the utility of the new group formed by users at the end of the list.

Algorithm 1 Resource Allocation & User Partitioning

Global input: Number of unicast users N, Number of multicast users M, Multicast user channel conditions sorted in non-decreasing, order $\hat{c}_1 \leq \ldots \leq \hat{c}_M$, Total resource blocks T, Fraction of resources blocks allowed for multicast $\alpha$
Output: Number of multicast groups K*, Multicast groups $\{G_k^*\}$, Multicast resources $\{x_k^*\}$
PARTITION
1: for K ← 1 to M do     ▷ K total groups
2:    for i ← 1 to 1 − K + M do     ▷ initialize
3:      U(K, i, 1) = UTILITY(K, {1, . . . , i})
4:    for k ← 2 to K do     ▷ first k groups
5:      for i ← k to k − K + M do     ▷ first i users
6:        for j ← k − 1 to i − 1 do     ▷ partition at user j
7:          $G_k$ ← {j + 1, . . . , i}
8:          u ← U(K, j, k −1) + UTILITY(K, $G_k$)
9:          if u > U(K, i, k) then
10:            U(K, i, k) ← u; p(K, i, k) ← j
11:    if U(K, M, K) > $U_{max}$ then     ▷ check for max utility
12:      $U_{max}$ ← U(K, M, K); K* ← K
13: j ← M     ▷ backtrack to find optimal solution
14: for k ← $K_{opt}$ to 1 do
15:    i ← j; j ← p(K, i, k); $G_k^*$ ← {j + 1, . . . , i}
16:    $x_k^*$ ← RESOURCEMULTI(K*, $G_k^*$)
Input: Number of groups K, Multicast group $G_k$
Output: Utility of group $u_k$
UTILITY(K, $G_k$)
1: $x_k$ ← RESOURCEMULTI(K, $G_k$)
2: $u_k$ ← $|G_k|$ log (min$_{i \in G_k}$ $\{\hat{c}_i\}$ $x_k$)
3: return $u_k$
Input: Number of groups K, Multicast group $G_k$
Output: Resources of group $x_k$
RESOURCEMULTI(K, $G_k$)

1: if $f(G_k) = 1$ then $x_k \leftarrow \dfrac{1}{K+N} T$

2: if $f(G_k) = |G_k|$ then

3:    if $\alpha \geq \dfrac{M}{M+N}$ then $x_k \leftarrow \dfrac{|G_k|}{M+N} T$ 4:    else $x_k \leftarrow \dfrac{|G_k|}{M} \alpha T$ 5: return $x_k$ Proposition 2. When $f(G_k)=|G_k|$, $\forall \alpha$ or $f^*(G_k)=1$, $\alpha \geq$ $$\frac{M}{N+M},$$

the recurrence relation for the dynamic program is:

$$U(g, i, k) = \max_{1 \leq j < i} \{U(K, j, k-1) + \text{UTILITY}(K, \{j+1, \ldots, i\})\}$$

where U(K,i,k) is the sum utility from the first i users in the first k partitions, when there are K multicast groups.

TABLE II

Users may selfishly try to deviate from the network operator's recommended multicast grouping.

| Scenario | User switch | Better coding scheme | Analysis results |
|---|---|---|---|
| IV-A | Unicast → multicast | Unicast | User never wants to switch from the operator's solution |

TABLE II-continued

Users may selfishly try to deviate from the network
operator's recommended multicast grouping.

| Scenario | User switch | Better coding scheme | Analysis results |
|---|---|---|---|
| IV-B | Unicast → multicast | Multicast | User always wants to switch, but operator prevents |
| IV-C | Multicast → unicast | Unicast | Number of switching users is bounded |
| IV-D | Multicast → unicast | Multicast | User never wants to switch |

The final solution to Prob. 1 is given by Alg. 1 and is a combination of dynamic programming to find the user grouping and convex optimization to find the optimal resource allocation. PARTITION builds up a table of utility values U(K, i, k) and selects the entry that gives the maximum utility value. UTILITY(K, $G_k$) gives the optimal utility obtained from users in group $G_k$ in a multicast group, when they are assigned resources using RESOURCEMULTI based on Prop. 1. The running time is $O(M^4)$ when $f(G_k)=1$ and $O(M^3)$ when $f(G_k)=|G_k|$.

III. Users' Selfish Switching Behaviors

In Section II, the network operator allocates spectrum resources to users to achieve a globally fair and efficient distribution of rates. However, this misses an important practical consideration: an individual user might selfishly maximize her rate by switching between multicast and unicast, deviating from the operator's desired solution. For example, if a user in a multicast group is forced to use a low coding scheme by the worst member of her multicast group, she might leave her multicast group to obtain a better rate on unicast. Similarly, a user interested in multicast content who has been placed in unicast might see that other multicast users who are grouped together are receiving more RBs, and try to join the group. The switching behavior is further complicated by the fact that if the user switches, the MCE re-allocates resources according to the new user groups created by the switch. The cellular operator should ensure that the user's rate under the globally optimal solution is high enough so that the user has no desire to switch from multicast to unicast, or vice versa.

The possible scenarios, as summarized in Table II, can be considered. In particular, $f(G_k)=|G_k|$ is used considering a single eNB and assuming that the multimedia content is available both through multicast and regular unicast data channels, and that the user can freely choose between them (possibly through a dedicated multicast mobile application). Our analysis shows that of the four scenarios, only one will result in users defecting from the globally optimal solution, and the number of users who exhibit such undesirable behavior is bound. Assuming no collusion between users, this disclosure focuses on one particular user i and group k, and drops the subscripts from the user coding scheme $c_i$, group coding scheme $\hat{c}_k$, and group $G_k$ for notational simplicity.

In this scenario, the user has better coding scheme if she remains on unicast than if she joins the multicast group. What is the incentive for the user to switch? The user may wish to join the multicast group to take advantage of the greater amount of resources allocated to the multicast group. This disclosure shows that the global solution is such that this will never happen. The idea is to show that if the user would like to switch from unicast to a multicast group, the global solution would have already put the user in the multicast group. Lemma 4 gives the relationship between parameters that results in the user or network operator desiring the switch. Prop. 3 shows that this does not occur.

Lemma 4. For $c > \hat{c}$, $f(G)=|G|$, a user will want to switch from unicast to multicast when $$\frac{c}{\hat{c}} < m.$$

The global utility will increase from this switch when $$\frac{c}{\hat{c}} < \left(1 + \frac{1}{|G|-1}\right)^{|G|-1} |G|.$$

Proposition 3. For $c > \hat{c}$, $f(G)=|G|$, if the solution is globally optimal, there will be no unicast user who wants to switch to multicast.

B. Unicast User Switches to Multicast, Better Coding Scheme

A unicast user may wish to join a multicast group with a better coding scheme. Since the multicast group's coding scheme is set to the minimum coding scheme of its members, if the user joins the multicast group, the multicast group will be forced to lower its coding scheme. This will lead to decreased rate for the other users in the multicast group. The analysis is similar to § III-A, which indicates that a user may indeed wish to deviate from the globally optimal solution. However, the network operator can avoid this undesirable scenario and maintain global fairness by either (a) refusing admission to the multicast group for the switching user, or (b) not lowering the coding scheme of the multicast group, rendering the user unable to decode the data and encouraging her to stay on unicast.

C. Multicast User Switches to Unicast, Better Coding Scheme

This is arguably the most interesting scenario. The global solution may prefer a user to be in a multicast group, but the user would receive a better coding scheme and higher rate if she were to leave the multicast group and switch to unicast transmission. The situation is further complicated by the fact that if a few users leave the multicast group, other users in the group may receive reduced rate and also desire to switch, creating a "ripple" effect. However, this disclosure shows that the number of potentially switching users per multicast group is bounded. The conditions under which the user or network operator desires the switch can be described as:

Lemma 5. For $\hat{c} > c$, $f(G)=|G|$, a user will want to switch from multicast to unicast when $$\frac{c}{\hat{c}} < m.$$

The global utility will increase from this switch when $$\frac{c}{\hat{c}} > \left(1 + \frac{1}{|G|-1}\right)^{|G|-1} |G|.$$

Prop. 4 bounds the number of switching users. The intuition is that users with better coding scheme are placed in the multicast group because even though they sacrifice their good coding scheme, by increasing the size of the multicast group, all the users in the multicast group benefit.

However, if there are many users with good coding scheme, placing them in a separate multicast group with higher coding scheme outweighs the decrease in utility of the remaining users in the multicast group. So the optimal solution contains only contains a few users who might want to switch to unicast.

Lemma 6. For $\hat{c}<c$, $0<\beta\leq 1$, if the solution is globally optimal, there are at most $$\left\lceil \frac{e}{\beta} \right\rceil - 1$$

users who have coding scheme$>\hat{c}\beta|G|$.

Proposition 4. For $\hat{c}<c$, if the solution is globally optimal, the number of users who switch is min n:

$$n+1 = \left\lceil \frac{e}{1 - \frac{n}{|G|}} \right\rceil.$$

For weighing functions other than $f(G)=|G|$, we numerically simulate the number of defecting users in FIG. 4. We find that no users tend to flee the multicast group when $f(G)=|G|$, which is better than our upper bound. The weighting functions $f(G)=1$ and $f(G)=\log(|G|)$ result in less rate for multicast users, so the number of user wishing to leave the group is higher.

Figure 5C:
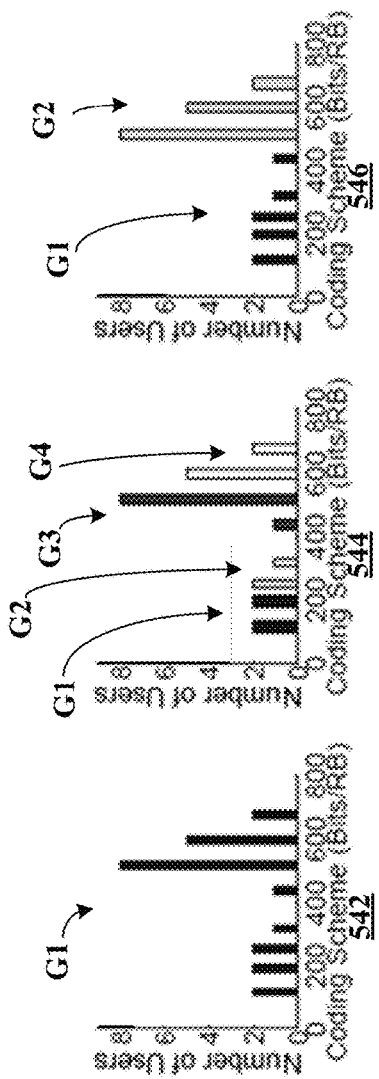
Figure 5B:
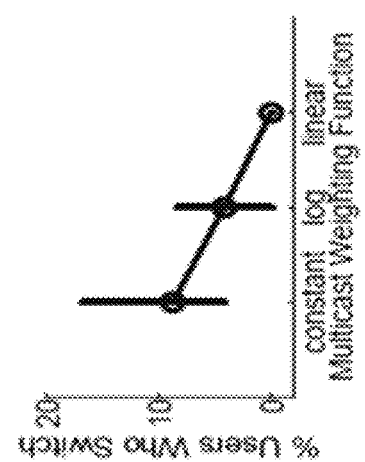

FIG. 5B presents example graphical results, for weighting functions other than $f(G)=|G|$, a numerical simulation of the number of defecting users. This indicates that no users tend to flee the multicast group when $f(G)=|G|$, which is better than our upper bound. The weighting functions $f(G)=1$ and $f(G)=\log(|G|)$ result in smaller rate for multicast users, so the number of users wishing to leave the group is higher.

D. Multicast User Switches to Unicast, Same Coding Scheme

The multicast user with the worst coding scheme in the group may consider switching out of the multicast group and going solo on unicast. As indicated, the user always prefers to stay in the multicast group because she gets (a) more resources, and (b) same coding scheme, so she receives greater rate on multicast than unicast.

IV. Performance Evaluation

This section compares the multicast resource allocation algorithm against several other approaches:

no-eMBMS (all unicast): Without eMBMS service, all potential multicast users access the content via unicast.

1 Group (all multicast) (1G): Put all the multicast users into a single group, and use the worst user's coding scheme as the group coding scheme.

1 Group+Time-variable coding scheme (1G-V): Put all the multicast users into single group, and vary the multicast group's coding scheme over time [10]. The key difference from VG is to vary the coding scheme over time rather than user partitions.

4 Groups+Fixed coding scheme (4G): Put the multicast users into 4 groups by dividing the range of channel conditions into 4 equal bins, and place users in associated bins. Four groups are chosen as a heuristic, but any fixed number of groups would have similar results.

Variable Groups+Fixed coding scheme (VG): Our proposed scheme, set $f(G_k)=|G_k|$ in § IV-A and § IV-B, but vary it in § IV-C.

Simulation setup: a range of parameters are considered in § IV-B and § IV-C. The default parameters, unless otherwise stated, are 50 unicast users and 24 users at one eNB who are interested in one multicast content. ⅔ of the users have good channel conditions and can use a high-rate coding scheme, and ⅓ of the users have poor channel conditions and use a low-rate coding scheme. The discrete set of possible coding schemes is specified by LTE and maps to approximately [20, 31, 50, 79, 116, 155, 195, 253, 318, 360, 439, 515, 597, 675, 733] bits/RB. The distribution of bits/RB for the users is bimodal normal with means 555 and 198 (¼ and ¾ of the range of coding schemes) and standard deviation 59 (to span the range of coding schemes).

A. Multicast Grouping, User Rate, and Packet Loss

The algorithm disclosed hereon chooses the optimal resource allocation, coding scheme, and user grouping to maximize the proportional fair metric. An example of the user grouping chosen by each algorithm is shown in FIG. 5C as bar graphs 542, 544 and 546. 1G and 1G-V put all the multicast users into one group, which does not take into account the heterogeneity of users' channel conditions, so 4G uses a heuristic to split the users into 4 groups. This sometimes forces many users with better channel conditions to form a multicast group with a few users with worse channel conditions, which is suboptimal. VG splits the users into two groups corresponding to the bi-modal distribution of channel conditions.

Figure 5D:
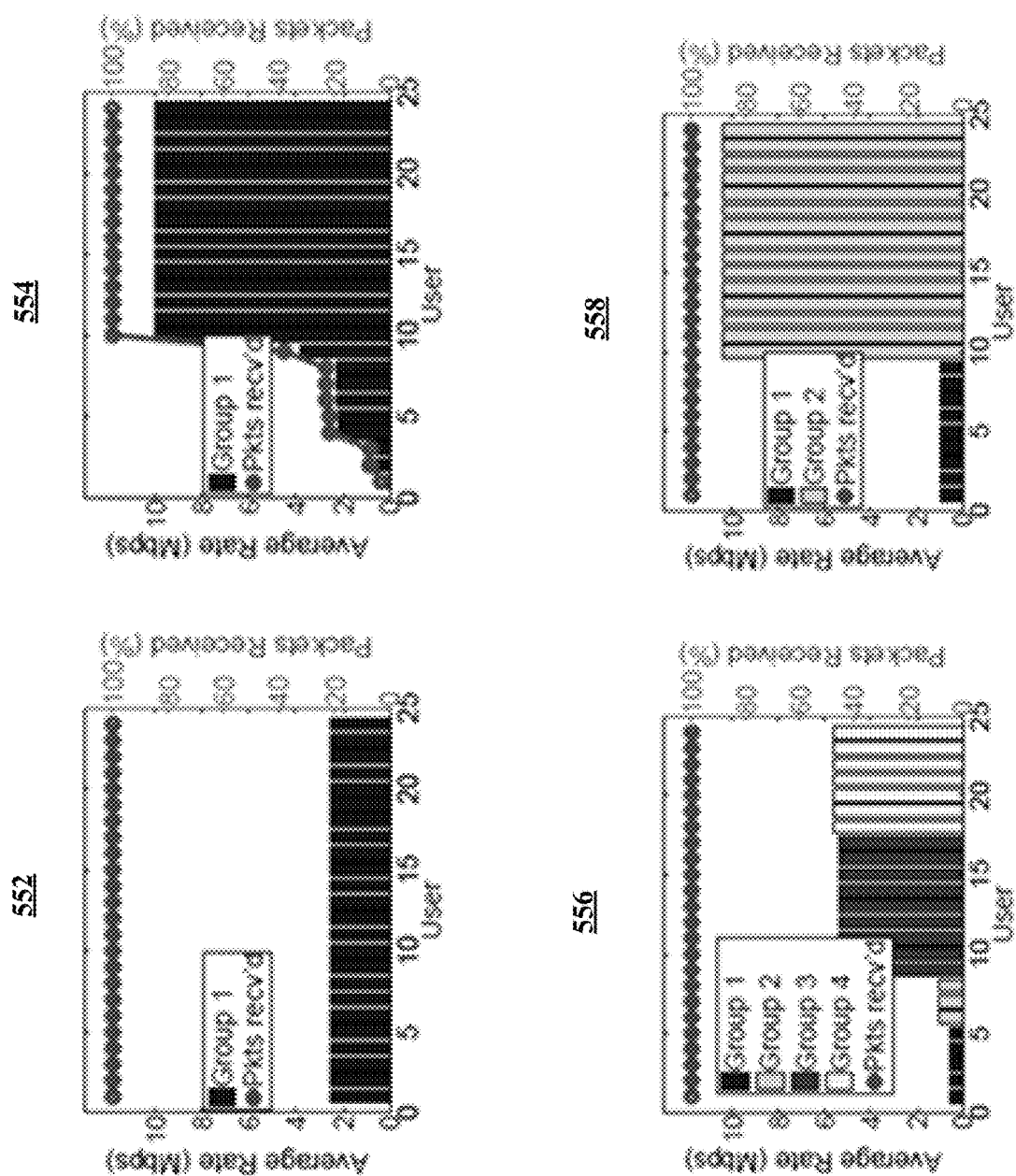

For the same experiment, a plot of the rate of the multicast users is shown in FIG. 5D. 1G uses a fixed coding scheme for all users, so users with good channel conditions are forced to use the same coding scheme as users with poor channel conditions, leading to low rate for all users, as shown in graph 552. Using heuristics to split the users into groups allows rate differentiation by 4G as shown in graph 556, but the proportional fair scheme of 1G-V can improve the throughput for all the users, as shown in graph 554. However, users with poor channel conditions may be unable to decode transmitted data, which is unacceptable for streaming data such as video. VG, however, ensures that all users can receive all data and reasonable rate commensurate with their channel conditions, as shown in graph 558. This is because VG is adaptive to the underlying channel conditions of the users, both in terms of number of users and their coding schemes.

B. Rate Gain Over No-eMBMS

Impact of number of multicast users: To examine the impact on user rates, the number of unicast users is fixed at 50 and the number of multicast users is varied from 4 to 24. Intuitively, there might be two possible outcomes: more multicast users means more RBs can be pooled together to obtain higher rate, or more multicast users will share a fixed amount of RBs and leave the remaining RBs for the unicast users. Diagram 562 of FIG. 5E plots the average multicast user's rate and shows that the first case occurs, since our algorithm adapts the multicast RBs based on the number of multicast users. 1G provides minimal rate gain despite the increased RBs, because it is constrained by the coding scheme of the worst user in the group. The rate of unicast users under our VG scheme does not change.

Impact of channel distribution: three different distributions of channel conditions are simulated: (1) a uniform distribution of the entire range of LTE coding schemes; (2) a bimodal distribution; and (3) normal distribution with parameters N(377, 119). For each distribution, this disclosure compares the rate provided by each algorithm. There are 50 unicast users and 24 multicast users. Diagram 564 of FIG. 5E shows the average user rate for increasingly (along the horizontal axis) homogeneous users, in terms of channel conditions. As indicated, 1G, which forms one group, does well when the users are very similar, and 4G, which forms 4 groups, does best when the channel conditions are heterogeneous. VG outperforms the fixed group formation algorithms in all cases since it recognizes the underlying user diversity and chooses appropriate groups and resource allocation for the users.

C. Impact of the Multicast Weighting Function

For the preceding experiments, VG used the linear multicast weighting function (10). In this set of experiments, the disclosure examines the performance of VG in more detail to find that this weighting function sometimes over-provisions for multicast users at the expense of unicast users. Diagram 572 of FIG. 5F shows the per user unicast rate, per-user multicast rate, and total rate across all users for different weighting functions. Although the linear weighting function makes the most efficient use of spectrum in terms of total rate, it achieves this primarily by giving the multicast users higher rate. The unicast rate is slightly lower when the linear multicast weighting function is used because the multicast resources are less constrained (4). The logarithmic and constant multicast weighting functions can achieve a better balance between unicast and multicast rate. Thus the multicast weighting function can be used to trade off the benefits of eMBMS between multicast and unicast users.

The impact of heterogeneity of user demand for multicast content across multiple eNBs is examined. One might expect cells with few multicast and many unicast users to suffer, because resources are being unnecessarily allocated for multicast. In this experiment, the disclosure sets up two eNBs, one with more unicast users (40) than multicast users (4), and one with fewer unicast user (10) than multicast users (20). In Diagram 574 of FIG. 5F, the average rate of the unicast users in each cell is plotted.

Similar to the single eNB case, the unicast rate is lowered when the linear multicast weighting function is used. The rate drop is significant in the cell with few unicast users, but the absolute value of the rate is quite high. However, if this drop is considered too large to maintain acceptable user-experience, one may wish to adopt a modified weighting function. In the cell with many unicast users, the rate drop is minimal, but this small contribution from each user can provide a significant benefit to the multicast rate. In neither case do the unicast users suffer unduly when the linear weighting function is used, but the logarithmic or constant weighting functions can give them increased rate at the expense of multicast user rate.

Figure 6:
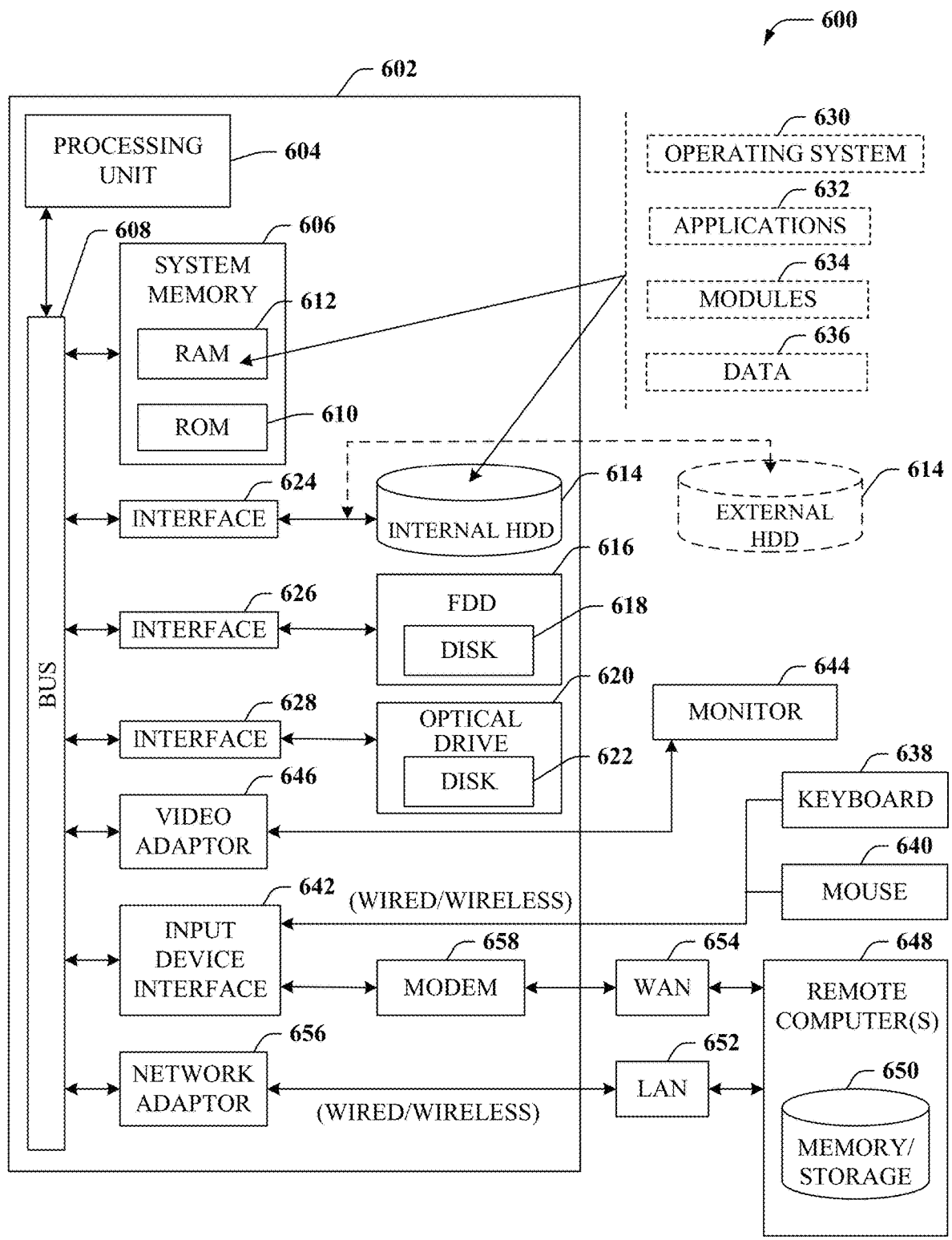
FIG. 6 is a block diagram of an example, non-limiting embodiment of a computing environment in accordance with various aspects described herein.

Turning now to FIG. 6, there is illustrated a block diagram of a computing environment in accordance with various aspects described herein. In order to provide additional context for various embodiments of the embodiments described herein, FIG. 6 and the following discussion are intended to provide a brief, general description of a suitable computing environment 600 in which the various embodiments of the subject disclosure can be implemented. In particular, computing environment 600 can be used in the implementation of network elements 150, 152, 154, 156, access terminal 112, base station or access point 122, switching device 132, media terminal 142, and/or virtual network elements 230, 232, 234, etc. Each of these devices can be implemented via computer-executable instructions that can run on one or more computers, and/or in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes processor as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 6, the example environment can comprise a computer 602, the computer 602 comprising a processing unit 604, a system memory 606 and a system bus 608. The system bus 608 couples system components including, but not limited to, the system memory 606 to the processing unit 604. The processing unit 604 can be any of various commercially available processors. Dual microprocessors and other multiprocessor architectures can also be employed as the processing unit 604.

The system bus 608 can be any of several types of bus structure that can further interconnect to a memory bus (with or without a memory controller), a peripheral bus, and a local bus using any of a variety of commercially available bus architectures. The system memory 606 comprises ROM 610 and RAM 612. A basic input/output system (BIOS) can be stored in a non-volatile memory such as ROM, erasable programmable read only memory (EPROM), EEPROM, which BIOS contains the basic routines that help to transfer information between elements within the computer 602, such as during startup. The RAM 612 can also comprise a high-speed RAM such as static RAM for caching data.

The computer 602 further comprises an internal hard disk drive (HDD) 614 (e.g., EIDE, SATA), which internal hard disk drive 614 can also be configured for external use in a suitable chassis (not shown), a magnetic floppy disk drive (FDD) 616, (e.g., to read from or write to a removable diskette 618) and an optical disk drive 620, (e.g., reading a CD-ROM disk 622 or, to read from or write to other high capacity optical media such as the DVD). The hard disk drive 614, magnetic disk drive 616 and optical disk drive 620 can be connected to the system bus 608 by a hard disk drive interface 624, a magnetic disk drive interface 626 and an optical drive interface 628, respectively. The interface 624 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 602, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 612, comprising an operating system 630, one or more application programs 632, other program modules 634 and program data 636. All or portions of the operating system, applications, modules, and/or data can also be cached in the RAM 612. The systems and methods described herein can be implemented utilizing various commercially available operating systems or combinations of operating systems.

A user can enter commands and information into the computer 602 through one or more wired/wireless input devices, e.g., a keyboard 638 and a pointing device, such as a mouse 640. Other input devices (not shown) can comprise a microphone, an infrared (IR) remote control, a joystick, a game pad, a stylus pen, touch screen or the like. These and other input devices are often connected to the processing unit 604 through an input device interface 642 that can be coupled to the system bus 608, but can be connected by other interfaces, such as a parallel port, an IEEE 1394 serial port, a game port, a universal serial bus (USB) port, an IR interface, etc.

A monitor 644 or other type of display device can be also connected to the system bus 608 via an interface, such as a video adapter 646. It will also be appreciated that in alternative embodiments, a monitor 644 can also be any display device (e.g., another computer having a display, a smart phone, a tablet computer, etc.) for receiving display information associated with computer 602 via any communication means, including via the Internet and cloud-based networks.

In addition to the monitor 644, a computer typically comprises other peripheral output devices (not shown), such as speakers, printers, etc.

The computer 602 can operate in a networked environment using logical connections via wired and/or wireless communications to one or more remote computers, such as a remote computer(s) 648. The remote computer(s) 648 can be a workstation, a server computer, a router, a personal computer, portable computer, microprocessor-based entertainment appliance, a peer device or other common network node, and typically comprises many or all of the elements described relative to the computer 602, although, for purposes of brevity, only a memory/storage device 650 is illustrated. The logical connections depicted comprise wired/wireless connectivity to a local area network (LAN) 652 and/or larger networks, e.g., a wide area network (WAN) 654. Such LAN and WAN networking environments are commonplace in offices and companies, and facilitate enterprise-wide computer networks, such as intranets, all of which can connect to a global communications network, e.g., the Internet.

When used in a LAN networking environment, the computer 602 can be connected to the local network 652 through a wired and/or wireless communication network interface or adapter 656. The adapter 656 can facilitate wired or wireless communication to the LAN 652, which can also comprise a wireless AP disposed thereon for communicating with the wireless adapter 656.

When used in a WAN networking environment, the computer 602 can comprise a modem 658 or can be connected to a communications server on the WAN 654 or has other means for establishing communications over the WAN 654, such as by way of the Internet. The modem 658, which can be internal or external and a wired or wireless device, can be connected to the system bus 608 via the input device interface 642. In a networked environment, program modules depicted relative to the computer 602 or portions thereof, can be stored in the remote memory/storage device 650. It will be appreciated that the network connections shown are example and other means of establishing a communications link between the computers can be used.

The computer 602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 7:
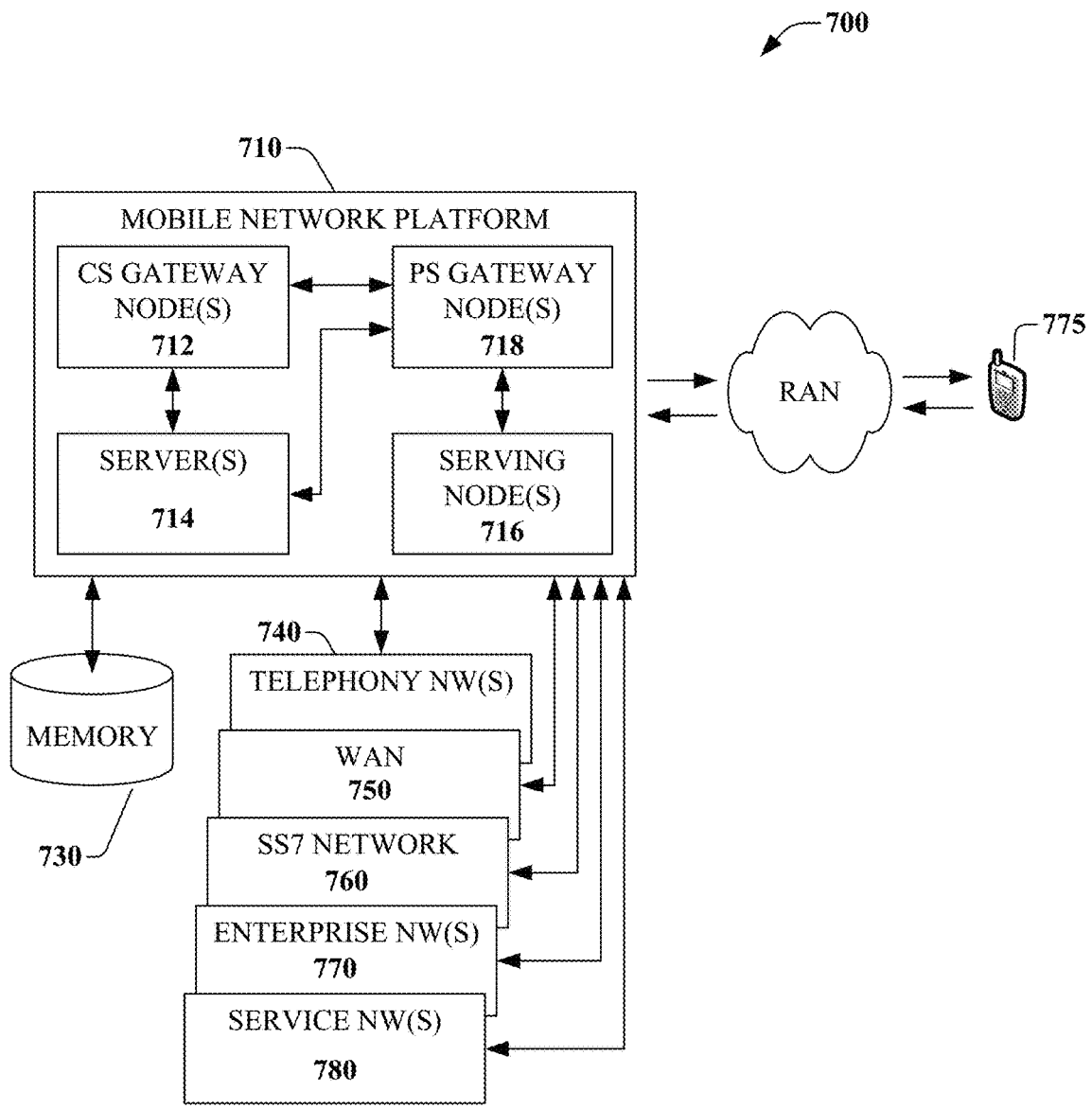
FIG. 7 is a block diagram of an example, non-limiting embodiment of a mobile network platform in accordance with various aspects described herein.

Turning now to FIG. 7, an embodiment 700 of a mobile network platform 710 is shown that is an example of network elements 150, 152, 154, 156, and/or virtual network elements 230, 232, 234, etc. In one or more embodiments, the mobile network platform 710 can generate and receive signals transmitted and received by base stations or access points such as base station or access point 122. Generally, wireless network platform 710 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 710 can be included in telecommunications carrier networks, and can be considered carrier-side components as discussed elsewhere herein. Mobile network platform 710 comprises CS gateway node(s) 712 which can interface CS traffic received from legacy networks like telephony network(s) 740 (e.g., public switched telephone network (PSTN), or public land mobile network (PLMN)) or a signaling system #7 (SS7) network 770. Circuit switched gateway node(s) 712 can authorize and authenticate traffic (e.g., voice) arising from such networks. Additionally, CS gateway node(s) 712 can access mobility, or roaming, data generated through SS7 network 770; for instance, mobility data stored in a visited location register (VLR), which can reside in memory 730. Moreover, CS gateway node(s) 712 interfaces CS-based traffic and signaling and PS gateway node(s) 718. As an example, in a 3GPP UMTS network, CS gateway node(s) 712 can be realized at least in part in gateway GPRS support node(s) (GGSN). It should be appreciated that functionality and specific operation of CS gateway node(s) 712, PS gateway node(s) 718, and serving node(s) 716, is provided and dictated by radio technology (ies) utilized by mobile network platform 710 for telecommunication.

In addition to receiving and processing CS-switched traffic and signaling, PS gateway node(s) 718 can authorize and authenticate PS-based data sessions with served mobile devices. Data sessions can comprise traffic, or content(s), exchanged with networks external to the wireless network platform 710, like wide area network(s) (WANs) 750, enterprise network(s) 770, and service network(s) 780, which can be embodied in local area network(s) (LANs), can also be interfaced with mobile network platform 710 through PS gateway node(s) 718. It is to be noted that WANs 750 and enterprise network(s) 760 can embody, at least in part, a service network(s) like IP multimedia subsystem (IMS). Based on radio technology layer(s) available in technology resource(s) 717, packet-switched gateway node(s) 718 can generate packet data protocol contexts when a data session is established; other data structures that facilitate routing of packetized data also can be generated. To that end, in an aspect, PS gateway node(s) 718 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 700, wireless network platform 710 also comprises serving node(s) 716 that, based upon available radio technology layer(s) within technology resource(s) 717, convey the various packetized flows of data streams received through PS gateway node(s) 718. It is to be noted that for technology resource(s) that rely primarily on CS communication, server node(s) can deliver traffic without reliance on PS gateway node(s) 718; for example, server node(s) can embody at least in part a mobile switching center. As an example, in a 3GPP UMTS network, serving node(s) 716 can be embodied in serving GPRS support node(s) (SGSN).

For radio technologies that exploit packetized communication, server(s) 714 in wireless network platform 710 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 710. Data streams (e.g., content(s) that are part of a voice call or data session) can be conveyed to PS gateway node(s) 718 for authorization/authentication and initiation of a data session, and to serving node(s) 716 for communication thereafter. In addition to application server, server(s) 714 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through wireless network platform 710 to ensure network's operation and data integrity in addition to authorization and authentication procedures that CS gateway node(s) 712 and PS gateway node(s) 718 can enact. Moreover, provisioning server(s) can provision services from external network(s) like networks operated by a disparate service provider; for instance, WAN 750 or Global Positioning System (GPS) network(s) (not shown). Provisioning server(s) can also provision coverage through networks associated to wireless network platform 710 (e.g., deployed and operated by the same service provider), such as the distributed antennas networks shown in FIG. 1(s) that enhance wireless service coverage by providing more network coverage.

It is to be noted that server(s) 714 can comprise one or more processors configured to confer at least in part the functionality of macro wireless network platform 710. To that end, the one or more processor can execute code instructions stored in memory 730, for example. It is should be appreciated that server(s) 714 can comprise a content manager, which operates in substantially the same manner as described hereinbefore.

In example embodiment 700, memory 730 can store information related to operation of wireless network platform 710. Other operational information can comprise provisioning information of mobile devices served through wireless platform network 710, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 730 can also store information from at least one of telephony network(s) 740, WAN 750, enterprise network(s) 770, or SS7 network 760. In an aspect, memory 730 can be, for example, accessed as part of a data store component or as a remotely connected memory store.

In order to provide a context for the various aspects of the disclosed subject matter, FIG. 7, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 8:
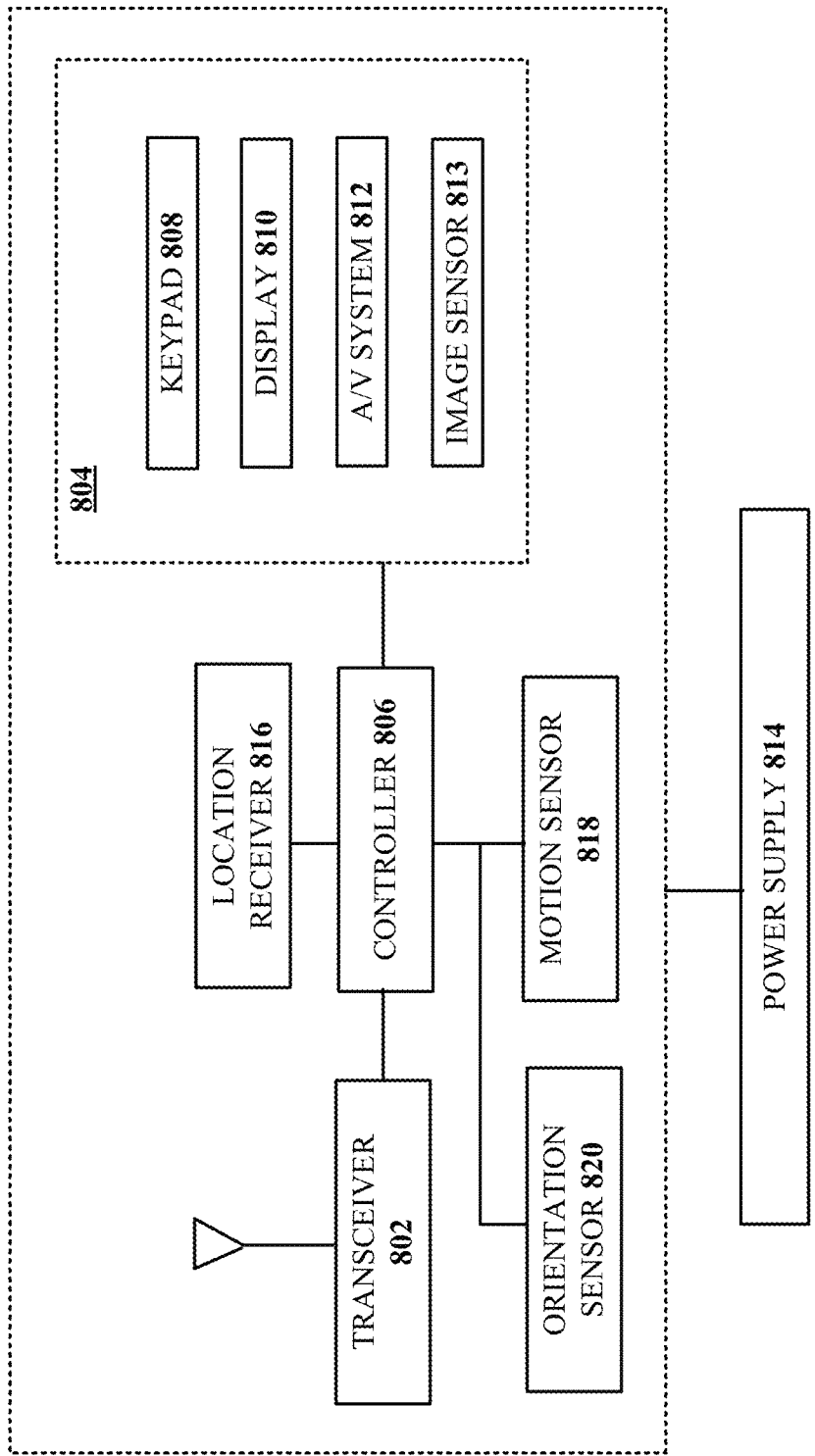
FIG. 8 is a block diagram of an example, non-limiting embodiment of a communication device in accordance with various aspects described herein.

Turning now to FIG. 8, an illustrative embodiment of a communication device 800 is shown. The communication device 800 can serve as an illustrative embodiment of devices such as data terminals 114, mobile devices 124, vehicle 126, display devices 144 or other client devices for communication via either communications network 125.

The communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface having graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable communications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

Figure 9:
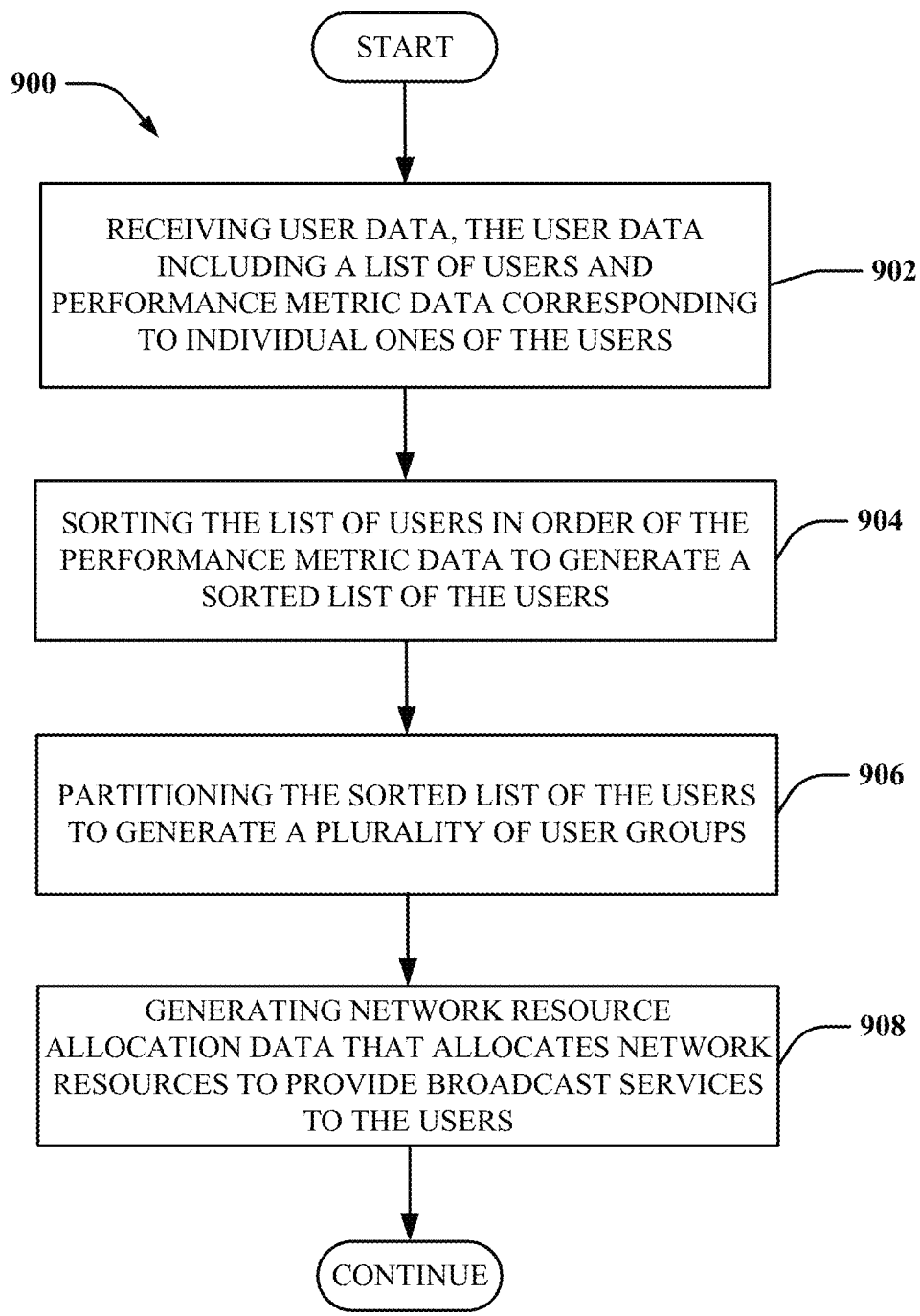
FIG. 9 illustrates a flow diagram of an example, non-limiting embodiment of a method in accordance with various aspects described herein.

Turning now to FIG. 9, a flow diagram 900 of an example, non-limiting embodiment of a method, is shown. In particular, a method is presented for use with one or more functions and features presented in conjunction with FIGS. 1-8. Step 902 includes receiving user data, the user data including a list of users and performance metric data corresponding to individual ones of the users. Step 904 includes sorting the list of users in order of the performance metric data to generate a sorted list of the users. Step 906 includes partitioning the sorted list of the users to generate a plurality of user groups. Step 908 includes generating network resource allocation data that allocates network resources to provide broadcast services to the users.

In an embodiment, the plurality of user groups includes at least one multicast user group. Partitioning the sorted list of the users can include determining if one of the plurality of user groups includes a single user, and allocating the network resources designates the single user, a unicast user, when the one of the plurality of user groups includes the single user. The performance metric can includes one of: coding performance such as a modulation and coding scheme or channel performance. Partitioning the sorted list of the users can generate a fixed or variable number of user groups. Sorting the list of the users in order of the performance metric data can include sorting the list of users as either: asymptotically increasing values of the performance metric or asymptotically decreasing values of the performance metric. The network resource allocation data can allocates wireless network resource to stream multimedia content to users on either a multicast basis or unicast basis. The plurality of user groups can be generated by partitioning the sorted list of users recursively, and in accordance with a weighted utility function.

While for purposes of simplicity of explanation, the respective processes are shown and described as a series of blocks in FIG. 9, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, xn)$, to a confidence that the input belongs to a class, that is, $f(x)=\text{confidence}$ (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A broadcast services platform comprising:
   a memory that stores operational instructions; and
   a processing circuit that includes a processor, coupled to the memory, that executes the operational instructions to:
   sort a list of users in order of performance metric data to generate a sorted list of the users, the performance metric data corresponding to individual ones of the users from the list of the users;
   partition the sorted list of the users to generate a plurality of multicast user groups; and
   generate network resource allocation data that allocates network resources to provide broadcast services amongst the plurality of multicast user groups.

2. The broadcast services platform of claim 1 wherein generating the network resource allocation data includes allocating a fraction of resources to each of the plurality of multicast user groups proportional to a size of the each of the plurality of multicast user groups.

3. The broadcast services platform of claim 1, wherein generating the network resource allocation data further includes determining a fraction of the network resources for allocation to at least one unicast user to provide broadcast services to the at least one unicast user, wherein a remaining fraction of the network resources is allocated amongst the plurality of multicast user groups.

4. The broadcast services platform of claim 1 wherein the performance metric data includes one of: coding performance or channel performance.

5. The broadcast services platform of claim 1 wherein partitioning the sorted list of the users, generates a fixed number of user groups.

6. The broadcast services platform of claim 1 wherein generating the network resource allocation data includes determining a one of a plurality of possible numbers of multicast user groups that optimizes resource allocation, and wherein the sorted list is partitioned in accordance with the one of the plurality of possible numbers of multicast user groups.

7. The broadcast services platform of claim 1 wherein sorting the list of the users in order of the performance metric data includes sorting the list of the users as one of: asymptotically increasing values of the performance metric data or asymptotically decreasing values of the performance metric data.

8. The broadcast services platform of claim 1 wherein the list of the users corresponds to a plurality of mobile users.

9. The broadcast services platform of claim 1 wherein the network resource allocation data allocates wireless network resource to stream multimedia content to users on a selected one of: multicast basis or unicast basis.

10. The broadcast services platform of claim 1 wherein the plurality of multicast user groups are generated by partitioning the sorted list of the users recursively, and in accordance with a weighted utility function.

11. A method comprising:
    sort a list of users in order of performance metric data to generate a sorted list of the users, the performance metric data corresponding to individual ones of the users from the list of the users;
    partition the sorted list of the users to generate a plurality of multicast user groups; and
    generate network resource allocation data that allocates network resources to provide broadcast services amongst the plurality of multicast user groups.

12. The method of claim 11 wherein generating the network resource allocation data includes allocating a fraction of resources to each of the plurality of multicast user groups proportional to a size of the each of the plurality of multicast user groups.

13. The method of claim 11 wherein generating the network resource allocation data further includes determining a fraction of the network resources for allocation to at least one unicast user to provide broadcast services to the at least one unicast user, wherein a remaining fraction of the network resources is allocated amongst the plurality of multicast user groups.

14. The method of claim 11 wherein the performance metric data includes one of: coding performance or channel performance.

15. The method of claim 11 wherein partitioning the sorted list of the users, generates a fixed number of user groups.

16. The method of claim 11 wherein generating the network resource allocation data includes determining a one of a plurality of possible numbers of multicast user groups that optimizes resource allocation, and wherein the sorted list is partitioned in accordance with the one of the plurality of possible numbers of multicast user groups.

17. The method of claim 11 wherein sorting the list of the users in order of the performance metric data includes sorting the list of the users as one of: asymptotically increasing values of the performance metric data or asymptotically decreasing values of the performance metric data.

18. The method of claim 11 wherein the network resource allocation data allocates wireless network resource to stream multimedia content to users on a selected one of: multicast basis or unicast basis.

19. The method of claim 11 wherein the plurality of multicast user groups are generated by partitioning the sorted list of the users recursively, and in accordance with a weighted utility function.

20. An article of manufacture that includes a tangible non-transitory storage medium that stores operational instructions, that when executed by a processor, causes the processor to:
   sort a list of users in order of performance metric data to generate a sorted list of the users, the performance metric data corresponding to individual ones of the users from the list of the users;
   partition the sorted list of the users to generate a plurality of multicast user groups; and
   generate network resource allocation data that allocates network resources to provide broadcast services amongst the plurality of multicast user groups.

* * * * *